Figure 1:
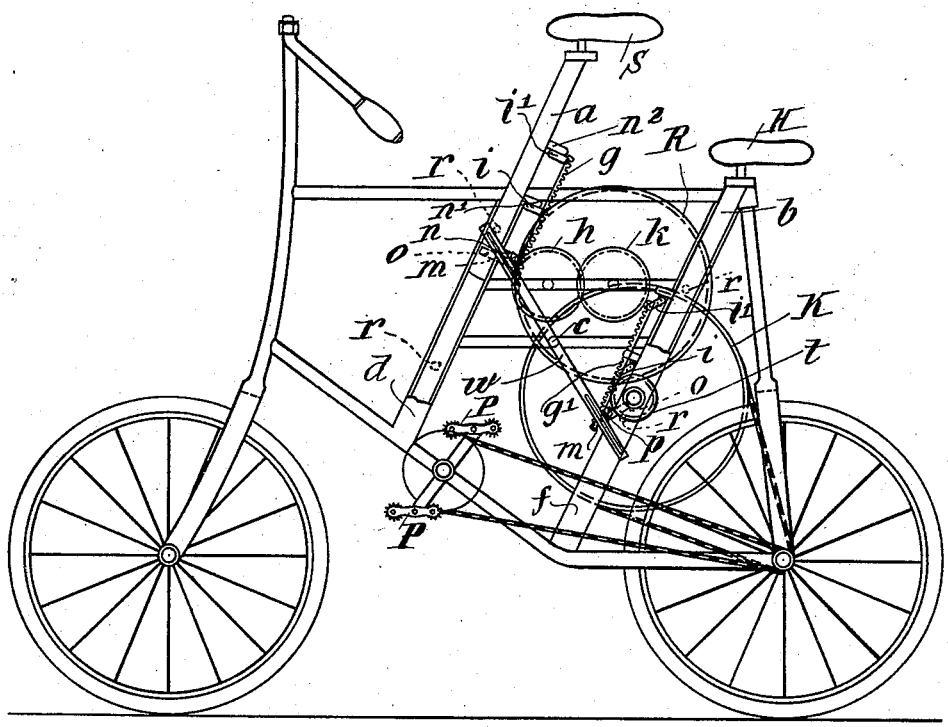

(No Model.)
2 Sheets—Sheet 1.

A. HÄNSEL.
CYCLE.

No. 599,705.
Patented Mar. 1, 1898.

Witnesses.
Alfred Meister
Heinrich Neubart

Inventor.
Albert Hänsel
by Eustace Hopkins
atty.

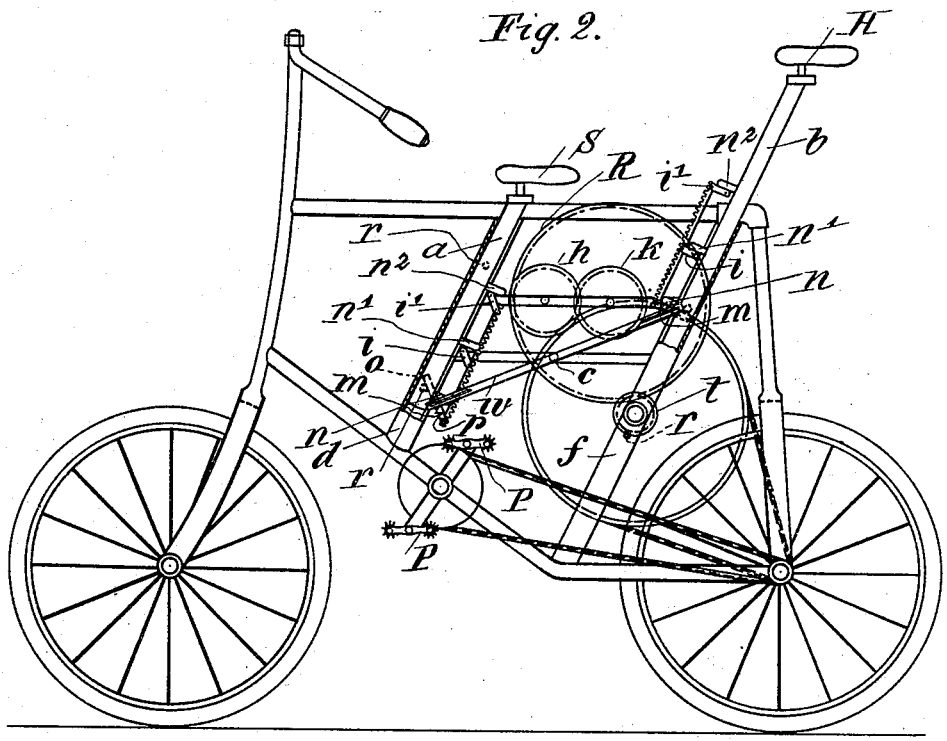
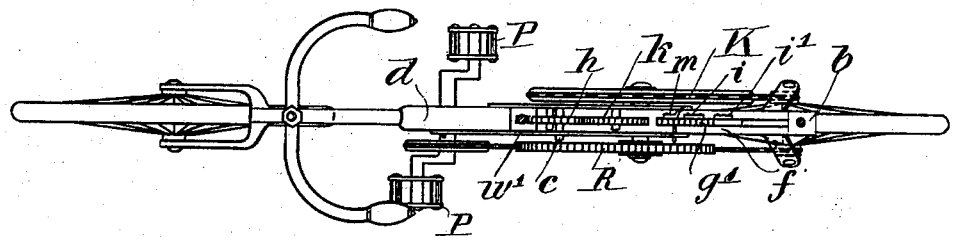

UNITED STATES PATENT OFFICE.

ALBERT HÄNSEL, OF ZEITZ, GERMANY.

CYCLE.

SPECIFICATION forming part of Letters Patent No. 599,705, dated March 1, 1898.

Application filed June 5, 1897. Serial No. 639,566. (No model.)

*To all whom it may concern:*

Be it known that I, ALBERT HÄNSEL, a subject of the King of Prussia, Emperor of Germany, residing at Zeitz, in the Kingdom of Prussia, German Empire, have invented certain new and useful Improvements in Cycles, of which the following is a full, clear, and exact description.

The present invention consists of improvements in bicycles; and the object of the same is to utilize the weight of the rider to propel the cycle forward. This object is attained by employing two seats, one of which gradually sinks under the weight of the rider while the other, which is geared to the first, gradually rises empty, so that the rider by changing his seat from the lower to the higher seat may continually employ the weight of his body to propel the cycle forward. The invention may be employed for any form of cycle; and in order to render the present specification more easily intelligible reference is had to the accompanying drawings, in which similar letters of reference denote similar parts throughout the several views.

Figure 1 is a side elevation of the bicycle with the foremost seat in its highest position and the rear seat down. Fig. 2 is a similar elevation with the positions of the seats reversed, and Fig. 3 is a plan of Fig. 2.

The wheels of the cycle are rather farther apart than with the ordinary safety, and the frame is provided with two diagonals $d$ and $f$, each carrying a vertically-sliding seat S and H, having stems $a$ and $b$, respectively adapted to slide up and down in the tubular diagonals $d$ and $f$. The stem $a$ is provided with a rack $g$ and stem $b$ with a rack $g'$. Both stems are coupled by means of a rod $w$, having slotted ends engaging pins in the said stems, so that when one seat rises or falls the other will be operated in the opposite direction. The said rod $w$ is pivoted at $c$ to the cycle-frame. The racks $g$ and $g'$ are mounted on their respective stems $a$ and $b$ so as to be capable of movement to and from the centers of said stems within certain limits, each rack being mounted on levers $m$, $i$, and $i'$, pivotally connected at $n$, $n'$, and $n^2$ to the said stem. The lowest of these levers $m$ is extended to the opposite side of its pivot, as at $o$, said extension being adapted to contact with a pin or stud $r$, fast on the cycle-frame, at the upper and lower limits of the motion of the seats. Thus when the seat has reached its highest position its lever extension $o$ will contact with the upper stop or pin $r$, and the rack $g$ or $g'$ will be turned outwardly, so as to engage one or other of the gears $h$ or $k$, according to which rack has been operated. The seat which has reached its lowest position will contact, by means of its lever extension $o$, with the lower stop $r$ and throw the rack inwardly or toward the stem, so that the same will no longer engage the gear $h$ or $k$. The gear $k$ is mounted fast on a spindle carrying a larger gear R, said gear R engaging a pinion $t$, which is fast on a spindle carrying a large chain-wheel K, having a chain engaging the driving-wheel of the cycle. The gear $k$ is engaged by the gear $h$, so that whichever of the two seats is carrying the weight of the rider it will operate to drive the driving-wheel of the cycle. The driving-wheel is also connected, by means of a chain, to the pedals P P in the ordinary manner, said pedals being mounted on a pedal-shaft carrying the driving chain-wheel in the well-known manner.

The racks $g$ and $g'$ are provided with snap-springs $p$, so arranged as to retain the rack in one or other of its end positions—*i. e.*, either in engagement or out of engagement with the corresponding gear $h$ or $k$.

The operation of the device will be readily understood from the drawings. If the rider wishes to utilize the weight of his body to propel the cycle, he must sit on the high seat, and as soon as this has sunk to its lowest position, by which time the lower seat will have been raised to its highest position, the seats must be changed, the rider changing from the lower to the higher seat. As soon as the lower seat has reached its lowest limit the extension $o$ of the lowest lever will strike the stop $r$ and throw the rack out of engagement with its corresponding gear, and when the upwardly-moving seat has reached its upper limit the rack on its stem will be thrown into engagement with the corresponding gear $h$ or $k$ by the extension $o$ striking the upper stop $r$ and the operation of the snap-spring aforesaid.

If desired, the rider may remain seated on the lower seat and work the cycle by means of the pedals P P in the ordinary manner. The arrangement of the bearings for the various spindles and stub-shafts may be of the ordinary construction or of any special construction, as the circumstances of the case may render advisable or advantageous.

I claim as my invention—

1. The combination of a cycle having two seats adapted to slide up and down, means for coupling the said seats, as specified, a train of gearing in connection with the driving-wheel of the cycle and racks operating said gearing on the movable seats and means in connection with said racks, to throw the rack of the downwardly-moving seat out of engagement with said gearing as soon as the said seat has reached its lower position and for throwing the rack of the other seat into engagement with the said gearing when the said second seat has been raised to its highest position substantially as described.

2. The combination in a cycle of two diagonals $d$ and $f$, seats S and H having stems $a$ and $b$ respectively to slide within said diagonals, a pivoted rod $w$ to connect said seat-stems as specified, a rack on each seat-stem and means for moving said rack to or from the stem according to the position of the said seat as specified, a train of gearing in connection with the driving-wheel of the cycle having gears $h$ and $k$ mounted in proximity to and adapted to be engaged by each of the said racks alternately on its downward movement substantially as described.

3. In a cycle the combination of two diagonals $d$ and $f$, seats S and H having stems $a$ and $b$ to slide up and down in said diagonals as specified, a pivoted connecting-rod to connect said seat-stems a rack mounted on each stem, said racks being supported on levers $m$ $i$ $i'$ pivoted to said stem, an extension to said lower lever of each stem and stops $r$ at the upper and lower ends of the path of movement of said extension-gearing in connection with the driving-wheel of the cycle having two gears $h$ and $k$ adapted to be engaged alternately by the racks $g$ and $g'$ respectively in the manner and for the purpose substantially as described.

In testimony whereof I have signed my name to this specification in the presence of two subscribing witnesses.

ALBERT HÄNSEL.

Witnesses:
RUDOLPH FRICKE,
HERM. LARK.